United States Patent
Sasaki et al.

(10) Patent No.: US 7,131,416 B2
(45) Date of Patent: Nov. 7, 2006

(54) ENGINE AIR INTAKE DEVICE

(75) Inventors: Junya Sasaki, Ayase (JP); Atsurou Kotouge, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 11/143,568

(22) Filed: Jun. 3, 2005

(65) Prior Publication Data

US 2006/0016415 A1    Jan. 26, 2006

(30) Foreign Application Priority Data

Jul. 22, 2004  (JP)  ............................. 2004-214098
Jul. 23, 2004  (JP)  ............................. 2004-215730

(51) Int. Cl.
    *F02M 35/10*    (2006.01)
(52) U.S. Cl. ............................. 123/184.36; 123/184.59
(58) Field of Classification Search ........... 123/184.26, 123/184.36, 184.44, 184.49, 184.51, 184.53, 123/184.59
    See application file for complete search history.

(56) References Cited

U.S. PATENT DOCUMENTS 5,027,769 A * 7/1991 Yoshida et al. ........ 123/184.44
5,408,962 A * 4/1995 Tallio et al. ........... 123/184.55
6,722,335 B1 * 4/2004 Nomura et al. ........ 123/184.36
6,978,755 B1 * 12/2005 Yamamoto et al. ..... 123/184.53

FOREIGN PATENT DOCUMENTS

JP       02108818    * 4/1990
JP       06-002625 A   1/1994
JP       10-037750 A   2/1998

* cited by examiner

*Primary Examiner*—Noah P. Kamen
(74) *Attorney, Agent, or Firm*—Global IP Counselors, LLP

(57) ABSTRACT

An engine air intake device comprises a collector divided by a partition wall into first and second volume chambers, first and second upstream intake pipe portions, a plurality of first and second downstream branch pipes, and a first communication valve. The first and second upstream intake pipe portions are connected to an upstream side of the first and second volume chambers, respectively. The first and second downstream branch pipes extend from the first and second volume chambers, respectively, to respective intake ports of first and second banks of first and second cylinders, respectively. The first communication valve is mounted to the partition wall in a position that does not interfere with a path of a main flow of intake air inside the collector and configured and arranged to allow communication between the first volume chamber and the second volume chamber when the first communication valve is open.

18 Claims, 6 Drawing Sheets

ENGINE AIR INTAKE DEVICE

CROSS-REFERENCE TO RELATED APPLICATIONS

This application claims priority to Japanese Patent Application Nos. 2004-214098 and 2004-215730. The entire disclosures of Japanese Patent Application Nos. 2004-214098 and 2004-215730 are hereby incorporated herein by reference.

BACKGROUND OF THE INVENTION

1. Field of the Invention

The present invention generally relates to an engine air intake device configured to execute variable resonance supercharging with respect to the intake air delivered to an internal combustion engine. More specifically, the present invention relates to an engine air intake device provided with two independent volume chambers (collector sections), each of which corresponds to one of two banks for two cylinder groups, two upstream intake pipe portions that connect to the upstream sides of each of the volume chambers, and at least one communication valve configured to allow communication between the two volume chambers. Moreover, the present invention relates to a seal structure for the engine intake device.

2. Background Information

Japanese Laid Open Patent Publication No. H10-37750A discloses a conventional engine air intake device in which the inside of the collector (surge tank) and an upstream portion thereof are divided into two volume chambers by a partition wall and a separation wall is provided inside each of the two volume chambers so as to form an intake passage inside each of the volume chambers. Each of the two cylinder groups is connected to the separate intake passage. A communication valve is provided in the partition wall and a selector valve is provided in each of the separation walls. By opening and closing the communication valve and the selector valves in different combinations, an output increasing effect resulting from resonance supercharging can be achieved in operating regions ranging from low engine speed regions to high engine speed regions.

Japanese Laid Open Patent Publication No. H06-2625 also discloses the torque Characteristic of an internal combustion engine can be improved by using a variable air intake device that is provided with a pair of intake air intake collectors, a communication passage that joins the two intake air intake collectors together such that intake air can flow therebetween, and a control valve arranged and configured to open and close the communication passage in accordance with the engine operating conditions, thereby enabling both resonance supercharging and inertia supercharging to be utilized effectively.

The conventional variable air intake device described in the above mentioned publication is provided with a pair of intake collectors to which branch pipes communicating with groups of cylinders having non-consecutive firing orders are connected. The intake collectors communicate with each other through a communication passage that is made of an aluminum alloy or other cast material and divided into a plurality of communication passages by a partition wall. A control valve is provided in a central portion of each communication passage. When the internal combustion engine is operating in a region of low rotational speed, the control valves are closed so that the two intake collectors are not allowed to communicate with each other and a resonance supercharging effect is obtained due to pulsation of the intake air. When the internal combustion engine is operating in a region of high rotational speed, the control valves are opened so that the two intake collectors can communicate with each other and an inertia supercharging effect is obtained due to the inertia of the intake air column. Each control valve comprises a valve stem and a rectangular valve element coupled to the valve stem. The valve stems of the control valves are supported in bearing holes formed in a partition wall and a side wall at a central portion of each communication passage and the bearing holes are configured to rotatably support the valve stems of the control valves.

In view of the above, it will be apparent to those skilled in the art from this disclosure that there exists a need for an improved engine air intake device. This invention addresses this need in the art as well as other needs, which will become apparent to those skilled in the art from this disclosure.

SUMMARY OF THE INVENTION

With the conventional technology described in the above mentioned references, the communication valve that enables communication between the two volume chambers is arranged in a position where the main flow of intake air passes. Consequently, particularly when the communication valve is fully open, the air flow resistance increases and the output declines, making it impossible to obtain the output increasing effect that the valves are intended to provide.

Moreover, since the resonance supercharging obtained with the conventional variable air intake device described above is sometimes accompanied by pressure pulsations in the two intake collectors that could interfere destructively with each other, in order to avoid impeding the resonance effect, it is necessary to construct the communication valves such that they can securely isolate the volume chambers from each other when the operating conditions require the communication valves to be closed.

However, conventional communication valves are made by machining bearing holes (for supporting a valve stem) and a valve seat into the cast metal partition wall (e.g., structural body made of an aluminum alloy or other material) in which the communication passages are formed. Consequently, highly precise machining is required in order to maintain a high degree of airtightness when the communication valves are closed, and such machining is expensive.

The high cost of increasing the airtightness of the valve elements and valve seats of the communication valves can be alleviated by using communication valves that comprise a valve element and valve seat and are made as a separate entity from the structural body in which the communication passages are formed (hereinafter called "passage structural body"). Such separate-entity communication valves are installed as a unit into the passage structural body after both the communication valve and the passage structural body have been fabricated. However, there has been a need for improving the airtightness between the communication valve and the passage structural body in order to prevent degradation of the resonance effect.

The present invention was conceived in view of these problems with the conventional engine air intake device having a collector divided into two volume chambers by a partition wall and a communication valve mounted in the partition wall. One object of the present invention is to provide an engine air intake device that can make the intake system more compact and improve the output performance of the engine in an effective manner by preventing the air flow resistance from increasing due to the communication valve.

Another object of the present invention is to provide a seal structure that can improve the seal performance between the two volume chambers in the engine air intake device in which the communication valve is configured as a separate entity from the structural body in which the communication passages are formed.

In order to achieve the above objects and other objects of the present invention, an engine air intake device is provided that basically comprises a collector, a first upstream intake pipe portion, a second upstream intake pipe portion, a plurality of first downstream branch pipes, a plurality of second downstream branch pipes, and a first communication valve. The collector is divided by a partition wall into first and second volume chambers. The first upstream intake pipe portion is connected to an upstream side of the first volume chamber relative to a flow of intake air. The second upstream intake pipe portion is connected to an upstream side of the second volume chamber relative to the flow of intake air. The first downstream branch pipes extend from the first volume chamber to respective intake ports of a first bank of first cylinders. The second downstream branch pipes extend from the second volume chamber to respective intake ports of a second bank of second cylinders. The first communication valve is mounted to the partition wall in a position that does not interfere with a path of a main flow of intake air inside the collector. The first communication valve is configured and arranged to allow communication between the first volume chamber and the second volume chamber when the first communication valve is open.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 7($b$) is a cross sectional view illustrating the seal structure between the first valve mounting structure and the partition wall in the engine air intake device in accordance with the first embodiment of the present invention as taken along a section line 7($b$)—7($b$) of FIG. 3.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
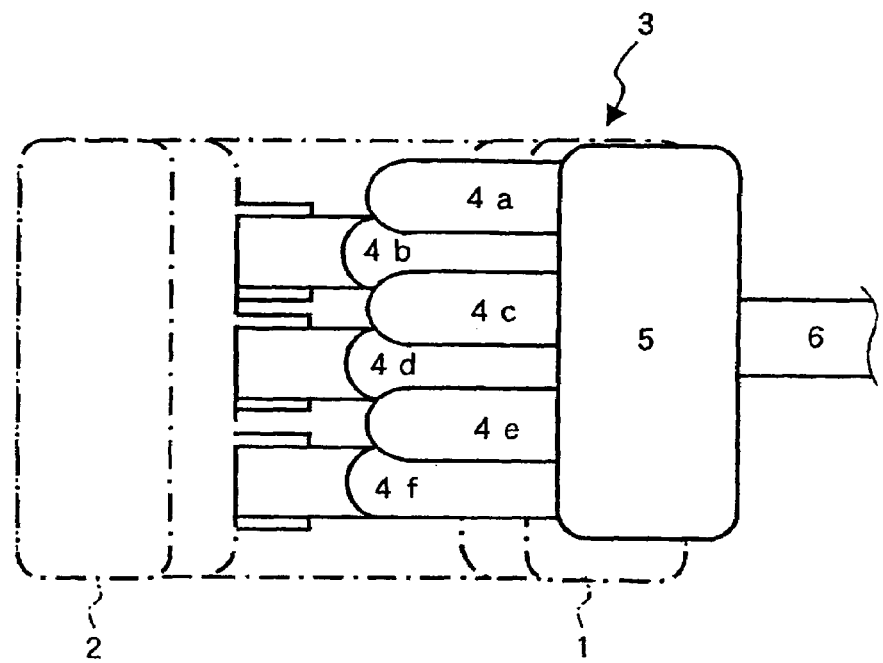
FIG. 1 is a schematic top plan view of a V6 engine with a engine air intake device in accordance with a first embodiment of the present invention.
Figure 2:
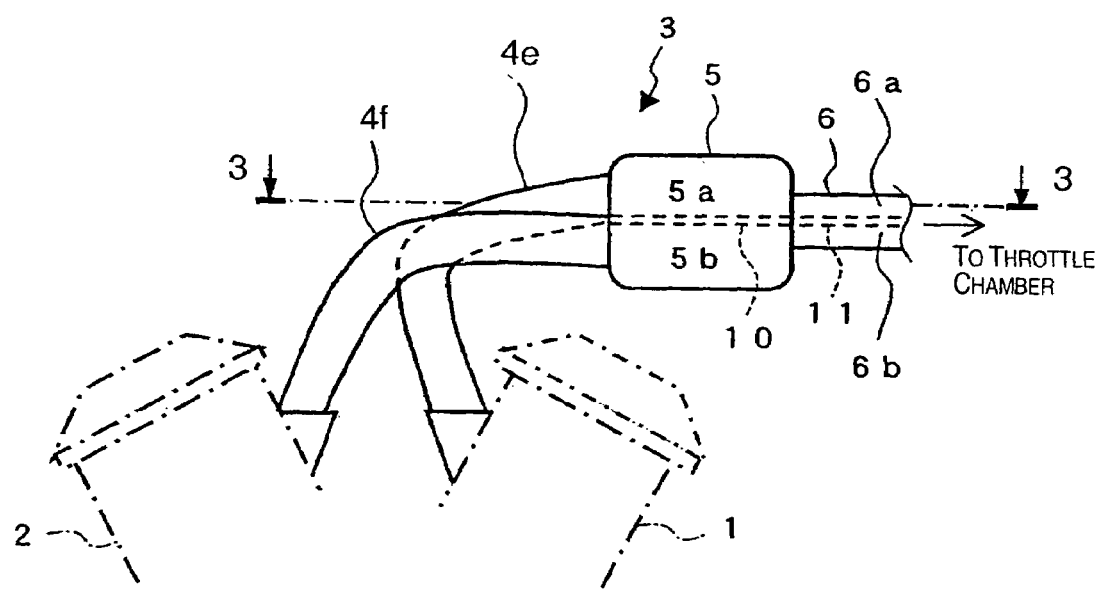
FIG. 2 is a schematic front elevational view of the same V6 engine illustrated in FIG. 1 in accordance with the first embodiment of the present invention.
Figure 3:
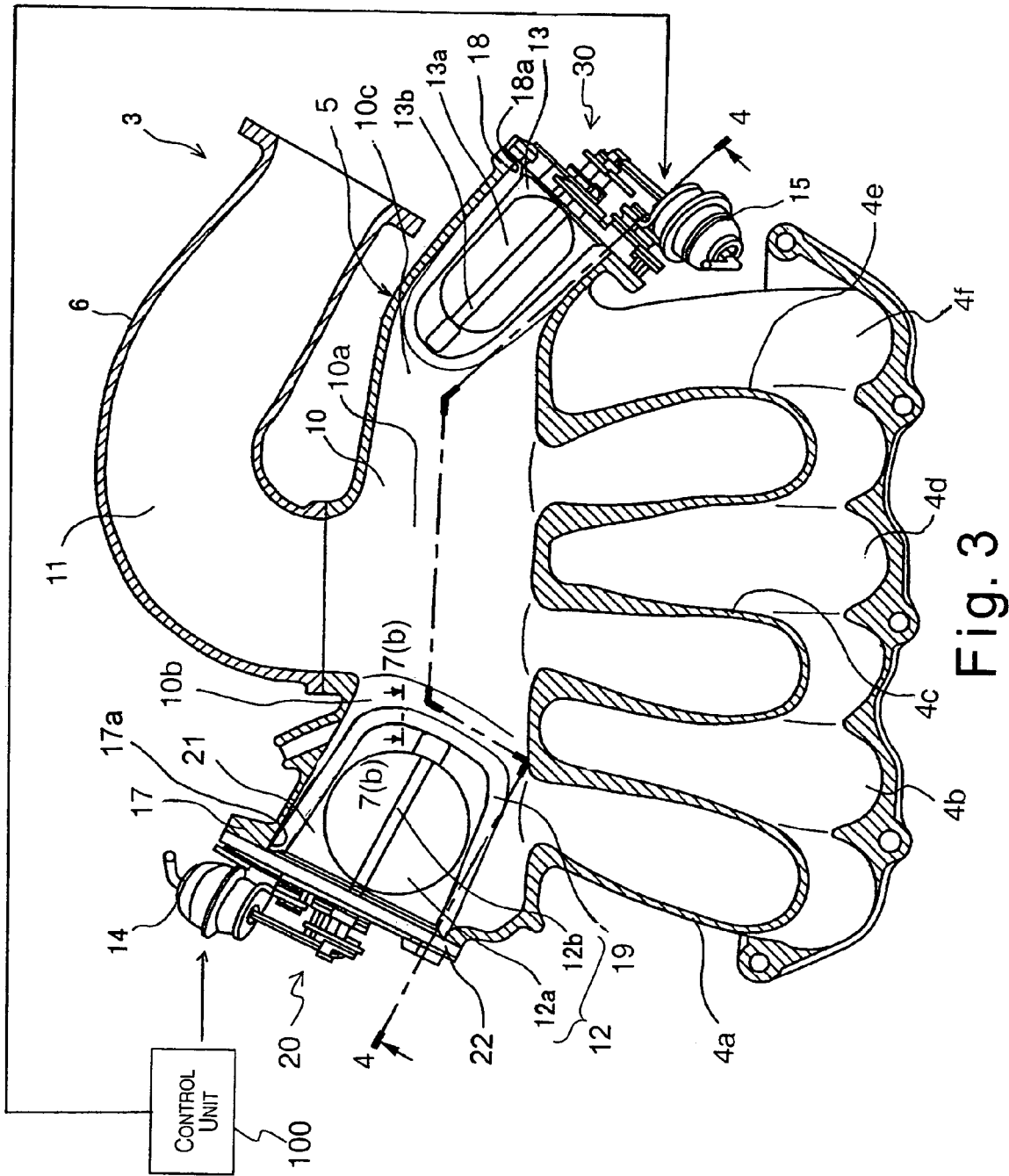
FIG. 3 is a cross sectional view of the engine air intake device in accordance with the first embodiment of the present invention as taken along a section line 3—3 in FIG. 2.
Figure 4:
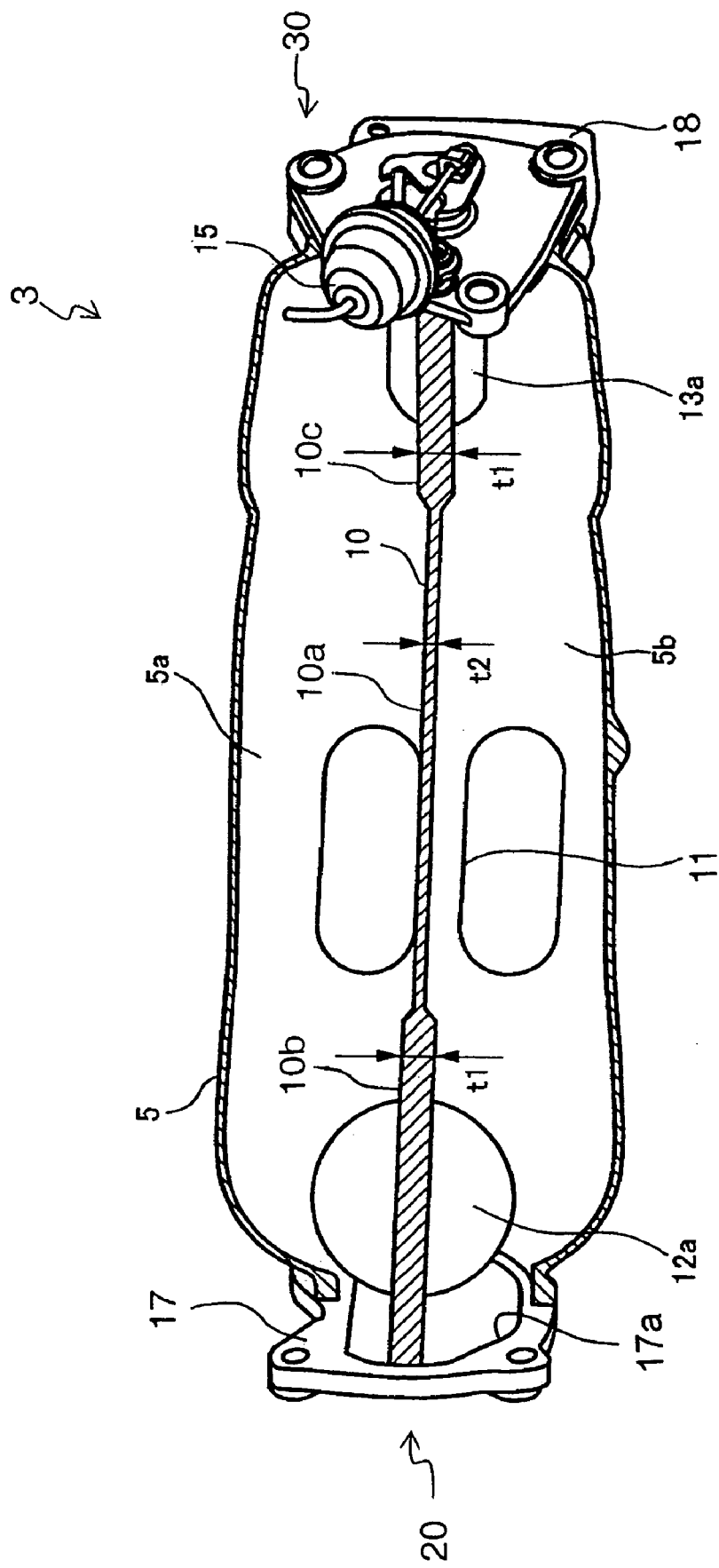
FIG. 4 is a cross sectional view of the engine air intake device in accordance with the first embodiment of the present invention as taken along a section line 4—4 in FIG. 3.

Referring initially to FIG. 1, an engine air intake device is illustrated in accordance with a first embodiment of the present invention. FIG. 1 is a schematic top plan view of an engine in which the air intake device in accordance with the first embodiment of the present invention has been employed. FIG. 2 is a schematic front elevational view of the engine. FIG. 3 is a cross sectional view of the engine air intake device of the first embodiment taken along a section line 3—3 in FIG. 2. FIG. 4 is a cross sectional view of the engine air intake device of the first embodiment taken along a section line 4—4 in FIG. 3. As seen in FIGS. 1 and 2, the engine in this embodiment is arranged as a V-6 type engine having a first cylinder bank 1 of a first cylinder group comprising three cylinders, and a second cylinder bank 2 of a second cylinder group comprising three cylinders with the first and second cylinder banks at an angle (V-shape) to each other. In this embodiment, the engine is controlled so that the cylinders of the first cylinder bank 1 do not have consecutive ignition timings, and the cylinders of the second cylinder bank 2 do not have consecutive ignition timings.

The engine has an intake manifold 3 including a total of six intake runners or branch pipes 4$a$ to 4$f$. The intake runners 4$a$, 4$c$ and 4$e$ extend to the cylinders of the first cylinder bank 1, and the intake runners 4$b$, 4$d$ and 4$f$ extend to the second cylinder bank 2. A manifold or collector 5 to which the upstream ends of the intake runners 4$a$ to 4$f$ all connect is preferably arranged above the first cylinder bank 1 as seen in FIGS. 1 and 2.

An intake pipe (hereinafter referred as an "upstream intake pipe") 6 that functions as a resonance pipe is connected to the upstream side of the collector 5 relative to the flow of the intake air. As shown in FIGS. 1 and 2, the upstream intake pipe 6 connects to the collector 5 at the approximate middle portion of the collector 5 relative to the direction in which the cylinders are lined up. A throttle chamber (not shown), connected to an air cleaner or the like, is preferably mounted to the upstream end of the upstream intake pipe 6.

As seen in FIG. 2, the collector 5 is divided in upper and lower sections by a generally horizontal partition wall 10 to form an upper volume chamber (hereinafter referred as "upper collector portion") 5$a$ and a lower volume chamber (hereinafter referred as "lower collector portion") 5$b$. The intake runners 4$a$, 4$c$ and 4$e$ extend from the upper collector portion 5$a$ and respectively connect to the cylinders of the first cylinder bank 1, and the intake runners 4$b$, 4$d$ and 4$f$ extend from the lower collector portion 5$b$ and respectively connect to the cylinders of the second cylinder bank 2. The upper collector portion 5a corresponds to the first volume chamber of the present invention and the lower collector portion 5b corresponds to the second volume chamber of the present invention. The intake runners 4a, 4c and 4e correspond to the first downstream branch pipes of the present invention and the intake runners 4b, 4d and 4f correspond to the second downstream branch pipes of the present invention.

Similarly to the collector 5, the upstream intake pipe 6 is divided by a partition wall 11 into upper and lower sections. The upper section (hereinafter referred as "upper intake pipe portion") 6a connects to the upper collector portion 5a and the lower section (hereinafter referred as "lower intake pipe portion") 6b connects to the lower collector portion 5b. Thus, separate upper and lower intake pipe portions 6a and 6b are independently connected to the upstream sides of the upper and lower collectors 5a and 5b, respectively. The upper intake pipe portion 6a corresponds to the first upstream intake pipe of the present invention and the lower intake pipe portion 6b corresponds to the second upstream intake pipe of the present invention. The collector 5 and the upstream intake pipe 6 can, for example, be made of a resin material and a single (common) partition wall can be used to divide both the collector 5 and the upstream intake pipe 6. In other words, the partition wall 10 of the collector 5 and the partition wall 11 of the upstream intake pipe 6 can be arranged as a one-piece, unitary member.

Accordingly, each cylinder of the first cylinder bank 1 (group of cylinders) communicates with the upper collector portion 5a and the upper intake pipe portion 6a through the independent intake runners 4a, 4c and 4e, and each cylinder of the second cylinder bank 2 (group of cylinders) communicates with the lower collector portion 5b and the lower intake pipe portion 6b through the independent intake runners 4b, 4d and 4f. In this embodiment, the engine is preferably controlled so that the firing order is, for example, as follows: the cylinder connected to the intake runner 4a→the cylinder connected to the intake runner 4d→the cylinder connected to the intake runner 4b→the cylinder connected to the intake runner 4e→the cylinder connected to the intake runner 4c→the cylinder connected to the intake runner 4f. The lengths of the intake runners 4a to 4f are preferably approximately the same.

Arrangement of Communication Valves

As shown FIG. 3, two communication valves, a first communication valve 12 and a second communication valve 13, are provided in the partition wall 10 that divides the inside of the collector 5 into the two volume chambers (i.e., the upper collector portion 5a and the lower collector portion 5b). The first communication valve 12 and the second communication valve 13 are preferably both arranged as butterfly valves and the first communication valve 12 includes a first valve element 12a and a first rotary shaft or valve stem 12b for rotating the first valve element 12a, and the second communication valve 13 includes a second valve element 13a and a second rotary shaft or valve stem 13b for rotating the second valve element 13a.

The first communication valve 12 and the second communication valve 13 are preferably arranged on opposite sides of the inside of the collector 5 and separated from each other along the direction in which the cylinders are lined up (lengthwise direction) as seen in FIG. 3. The first and second communication valves 12 and 13 are driven by a first actuator 14 and a second actuator 15, respectively, that are mounted to opposite sides of the outside of the collector 5 and separated from each other along the direction in which the cylinders are lined up. The first actuator 14 and the second actuator 15 are controlled by a control unit 100 based on the engine operating conditions. The first communication valve 12 and the first actuator 14 are integrally formed with a first valve mounting structure 20 that is installed in the collector 5 as a unit, and the second communication valve 13 and the second actuator 15 are integrally formed with a second valve mounting structure 30 that is installed in the collector 5 as a unit. More specifically, the first valve mounting structure 20 is installed at a flange 17 provided in the periphery of an insertion hole 17a formed on one end of the collector 5 for mounting the first valve mounting structure 20, and the second valve mounting structure 30 is installed at a flange 18 provided in the periphery of an insertion hole 18a formed on the other end of the collector 5 for mounting the second valve mounting structure 30 as seen in FIGS. 3 and 4. The first and second valve mounting structures 20 and 30 will be explained in more detail below.

When the first communication valve 12 and the second communication valve 13 are both closed, the collector 5 forms two independent volume chambers, the upper collector portion 5a and the lower collector portion 5b, and the upper collector portion 5a is used by the first cylinder bank 1 and the lower collector portion 5b is used by the second cylinder bank 2 independently. More specifically, the upper collector portion 5a becomes a volume chamber exclusively for the cylinders of the first cylinder bank 1 and the lower collector portion 5b becomes a volume chamber exclusively for the cylinders of the second cylinder bank 2.

On the other hand, when the first communication valve 12 and/or the second communication valve 13 are/is open, the upper collector portion 5a and the lower collector portion 5b communicate with each other and the collector 5 becomes one common volume chamber serving both of the first and second cylinder banks 1 and 2.

As shown in FIGS. 3 and 4, the partition wall 10 includes a wall body section 10a, a first valve receiving section 10b, and a second valve receiving section 10c. The first valve receiving section 10b is portion of the partition wall 10 including an area where the first communication valve 12 is mounted to and the vicinity thereof. The second valve receiving section 10c is portion of the partition wall 10 including an area where the second communication valve 13 is mounted to and the vicinity there. As shown in FIG. 4, the first valve receiving section 10b and the second valve receiving section 10c of the partition wall 10 both have a thickness t1 that is larger than a thickness t2 of the wall body section 10a of the partition wall. In other words, the thickness t1 of portions located on opposite sides of the partition wall 10 relative to the direction in which the cylinders are lined up (the first valve mounting section 10b and the second valve mounting section 10c), is larger than the thickness t2 of the remaining portion (the wall body section 10a) of the partition wall 10. As a result, in comparison with a case in which the partition wall has a uniform thickness, the partition wall 10, and thus the collector 5, can be made sufficiently strong while also reducing the collector volume when the first communication valve 12 and the second communication valve 13 are closed. Since the collector 5 forms two independent volume chambers (i.e., the upper collector portion 5a and the lower collector portion 5b) when the first and second communication valves 12 and 13 are closed, "collector volume" means the respective volumes of the upper collector portion 5a and the volume of the lower collector portion 5b. Consequently, the pulsations that occur when the first communication valve 12 and the second communication valve 13 are closed increase in magnitude and the volumetric efficiency improves.

Figure 5:
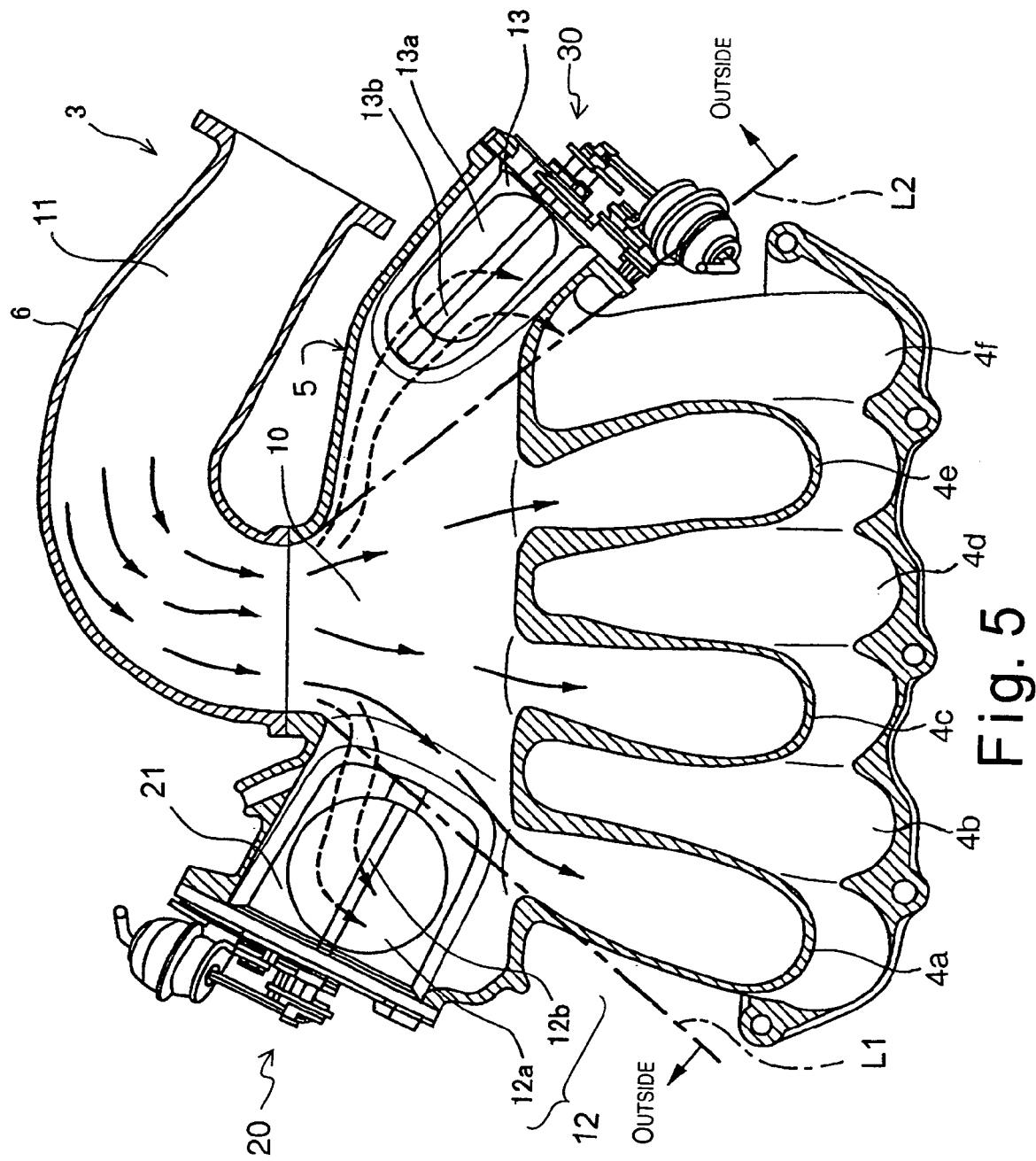
FIG. 5 is a diagrammatic view of the engine air intake device schematically illustrating the positional relationships between the flows of intake air inside the collector and communication valves in accordance with the first embodiment of the present invention.

The arrangement of the first communication valve 12 and the second communication valve 13 will now be described in further detail with reference to FIG. 5 (which, similarly to FIG. 3, is a cross sectional view taken along section line 3—3 of FIG. 1). FIG. 5 illustrates the flow of the intake air inside the collector 5 in a simplified manner.

As described previously, the first communication valve 12 and the second communication valve 13 are arranged on opposite sides of the partition wall 10 and separated from each other along the direction in which the cylinders are lined up. More specifically, the first and second valve elements 12a and 13a of the first and second communication valves 12 and 13, respectively, are arranged in positions where they avoid the intake air that flows inside the collector 5 from the upstream intake pipe 6 toward the intake runners 4a to 4f (hereinafter called the "main flow of the intake air" and indicated in FIG. 5 with solid-line arrows). In other words, the first and second communication valves 12 and 13 are arranged such that, in a plane parallel to the partition wall 10 inside the collector 5, the first and second valve elements 12a and 13a lie to the outside of a pair of hypothetical planes L1 and L2 (single-dot chain lines in FIG. 5) extending perpendicular to the partition wall 10 and joining an outer edge of the opening of the upstream intake pipe 6 (which connects to the approximate middle portion of the collector 5 relative to the direction in which the cylinders are lined up) to an outer edge of the outermost intake runners 4a and 4f, respectively. In other words, the hypothetical plane L1 extends between the outer edge of the opening of the upper intake pipe portion 6a and the outer end edge of an opening of the intake runner 4a that is located at a first end position. The hypothetical plane L2 extends between the outer edge of the opening of the lower intake pipe portion 6b and the outer end edge of an opening of the intake runner 4f that is located at a second end position. Thus, regardless of whether the first communication valve 12 and the second communication valve 13 are open or closed, the first communication valve 12 and the second communication valve 13 do not impose a flow resistance against the main flow of the intake air from the intake pipe 6 to the intake runners 4a to 4f.

Each of the first and second communication valves 12 and 13 is arranged such that the first and second rotary shafts 12b and 13b, respectively, are to be approximately parallel to the general flow direction of the intake air (hereinafter called "intake air communication flow" and indicated with broken-line arrows in FIG. 5) that flows between the upper collector portion 5a and the lower collector portion 5b when the first and second communication valves 12 and 13 are opened by the first and second actuators 14 and 15, respectively (or parallel to the upstream inner walls 5c, 5d of the collector 5). This arrangement of the first and second rotary shafts 12b and 13b prevents the first and second valve elements 12a and 13a from impeding the intake air communication flows that occur when the first and second communication valves 12 and 13 are open and thereby enables the flow resistance with respect to the intake air communication flows to be reduced in addition to reducing the flow resistance with respect to the main flow of the intake air.

The control unit 100 is configured and arranged to receive input indicating the engine rotational speed, the engine load, and other engine operating conditions and to control the opening and closing of the first and second communication valves 12 and 13 based on the engine operating conditions. An example of the process in which the control unit 100 controls the first and second communication valves 12 and 13 and improves the volumetric efficiency (increases the engine output) will now be presented.

In low and medium engine speed regions, the control unit 100 is configured and arranged to fully close both the first communication valve 12 and the second communication valve 13. As a result, the first and second cylinder banks 1 and 2 each draw the intake air from the independent volume chamber (i.e., the upper collector portion 5a and the lower collector portion 5b, respectively) and the volumetric efficiency is improved due to a resonance supercharging effect.

Meanwhile, in high engine speed regions, the control unit 100 is configured and arranged to fully open both the first communication valve 12 and the second communication valve 13. As a result, the upper collector portion 5a and the lower collector portion 5b communicate with each other so that the first and second cylinder banks 1 and 2 draw the intake air from one common volume chamber having a large volume (i.e., the entire collector 5) and the volumetric efficiency is improved due to an inertia supercharging effect.

Although, two communication valves, the first and second communication valves 12 and 13 are provided in the first embodiment, the number of the communication valve is not limited to two in the present invention. So long as the communication valves are arranged in positions that avoid the main flow of intake air inside the collector 5, it is acceptable to have three or more communication valves. Alternatively, one of the first and second communication valves 12 and 13 can be eliminated in the present invention so that the engine air intake device of the present invention has only one communication valve, the first communication valve 12 or the second communication valve 13, that is disposed in the position that avoids main flow of intake air inside the collector 5.

Furthermore, although the first and second communication valves 12 and 13 are arranged as the butterfly valves in the first embodiment, the communication valves 12 and 13 of the present invention is not limited to such a type of communication valves. It is also acceptable for all or a portion of the communication valves to be flap valves. Furthermore, although the first communication valve 12 and the second communication valve 13 in the first embodiment are illustrated as being different in shape, it is also acceptable for the first and second communication valves 12 and 13 to have the same shape.

Although, in the first embodiment described above, the upstream intake pipe 6 is divided into the upper intake pipe portion 6a and the lower intake pipe portion 6b by the partition wall 11 and connected to the collector 5 (i.e., the upper collector portion 5a and the lower collector portion 5b) at the approximate middle portion of the collector 5 relative to the direction in which the cylinders are lined up, the present invention is not limited to such an arrangement. For example, it is also acceptable to have two independent intake pipes connected to the upper collector portion 5a and lower collector portion 5b, respectively. Furthermore, so long as the first communication valve 12 and the second communication valve 13 are arranged in positions where they avoid the main flow of intake air, it is acceptable to arrange the upstream intake pipe 6 (i.e., the upper intake pipe portion 6a and the lower intake pipe portion 6b) to be connected to the collector 5 at a position other than in the approximate middle relative to the direction in which the cylinders are lined up.

In the embodiment described above, the upper intake pipe portion 6a and the lower intake pipe portion 6b connect to the upper collector portion 5a and the lower collector portion 5b, respectively, at the approximate middle portion of the collector 5 relative to the direction in which the cylinders are lined up. Moreover, the first and second communication valves 12 and 13 are arranged such that, in a plane parallel to the partition wall 10 inside the collector 5, the first and second valve elements 12a and 13a are disposed on the outside of the hypothetical lines L1 and L2 joining the upstream intake pipe 6 and the outermost intake runners 4a and 4f, respectively. Thus, the first communication valve 12 (i.e., the valve element 12a thereof) and the second communication valve 13 (i.e., the valve element 13a thereof) are arranged in positions where they avoid the main flow of the intake air inside the collector 5. As a result, even when the first and second communication valves 12 and 13 are open, the first and second valve elements 12a and 13a do not disturb the main flow of intake air. Therefore, the air flow resistance is prevented from increasing due to the first and second communication valves 12 and 13.

The first and second communication valves 12 and 13 are also arranged such that the first and second rotary shafts 12b and 13b that are configured and arranged to rotate the first and second valve elements 12a and 13a, respectively, are oriented to be approximately parallel to the direction of the flows of intake air (intake air communication flows) that occur when the communication valves 12 and 13 are open. As a result, the flow resistance with respect to the intake air communication flows that flow between the upper collector portion 5a and the lower collector portion 5b when the communication valves 12 and 13 are open can be reduced in addition to reducing the flow resistance with respect to the main flow of the intake air.

Additionally, the thickness t1 of the first and second valve receiving sections 10b and 10c of the partition wall 10 is larger than the thickness t2 of the wall body section 10a of the partition wall 10. As a result, comparing to when a partition wall is formed with a consistent thickness (e.g., the thickness t2), the decrease in the total collector volume (volume of entire collector 5) that is obtained when the first communication valve 12 and the second communication valve 13 are open can be held to a minimum with providing a sufficient stability to the collector 5. At the same time, the individual collector volumes (i.e., the individual volumes of the upper collector portion 5a and the volume of the lower collector portion 5b) obtained when the first communication valve 12 and the second communication valve 13 are closed can be reduced. Thus, when the first communication valve 12 and the second communication valve 13 are opened, the larger total collector volume of the collector 5 enables the volumetric efficiency to be significantly improved due to the inertia effect. Meanwhile, when the first communication valve 12 and second communication valve 13 are both closed, the smaller individual volumes of the upper collector portion 5a and the lower collector portion 5b have the effect of increasing the magnitude of the pulsations that occur and, thus, enable the volumetric efficiency to be improved effectively due to resonance supercharging. As a result, the output of the engine can be improved across operating regions ranging from low engine speeds to high engine speeds by appropriately controlling the opening and closing of the first communication valve 12 and the second communication valve 13 based on the engine operating conditions. Additionally, with the arrangement of the present invention, a sufficient strength can be secured for both the partition wall 10 and the collector 5.

Since the first actuator 14 and the second actuator 15 that drive (open and close) the first communication valve 12 and the second communication valve 13, respectively, are mounted on opposite sides of the collector 5 (opposite outside walls) and separated from each other along the direction in which the cylinders are lined up, a concentration of weight in the intake system is prevented and the overall weight distribution of the intake system can be balanced. The balanced weight distribution facilitates, for example, the work of installing the intake system into a vehicle.

Since the inside of the single upstream intake pipe 6 that connects to the upstream side of the collector 5 is divided into two sections by the partition wall 11 to form the upper intake pipe portion 6a and the lower intake pipe portion 6b, the collector 5 and the upstream intake pipe 6 can, for example, be made of a resin material and a single (common) partition wall integrating the partition wall 10 and the partition wall 11 can be used to divide both the collector 5 and the upstream intake pipe 6, thereby reducing both the cost and the number of parts.

Seal Structure for Air Intake Device

Figure 6:
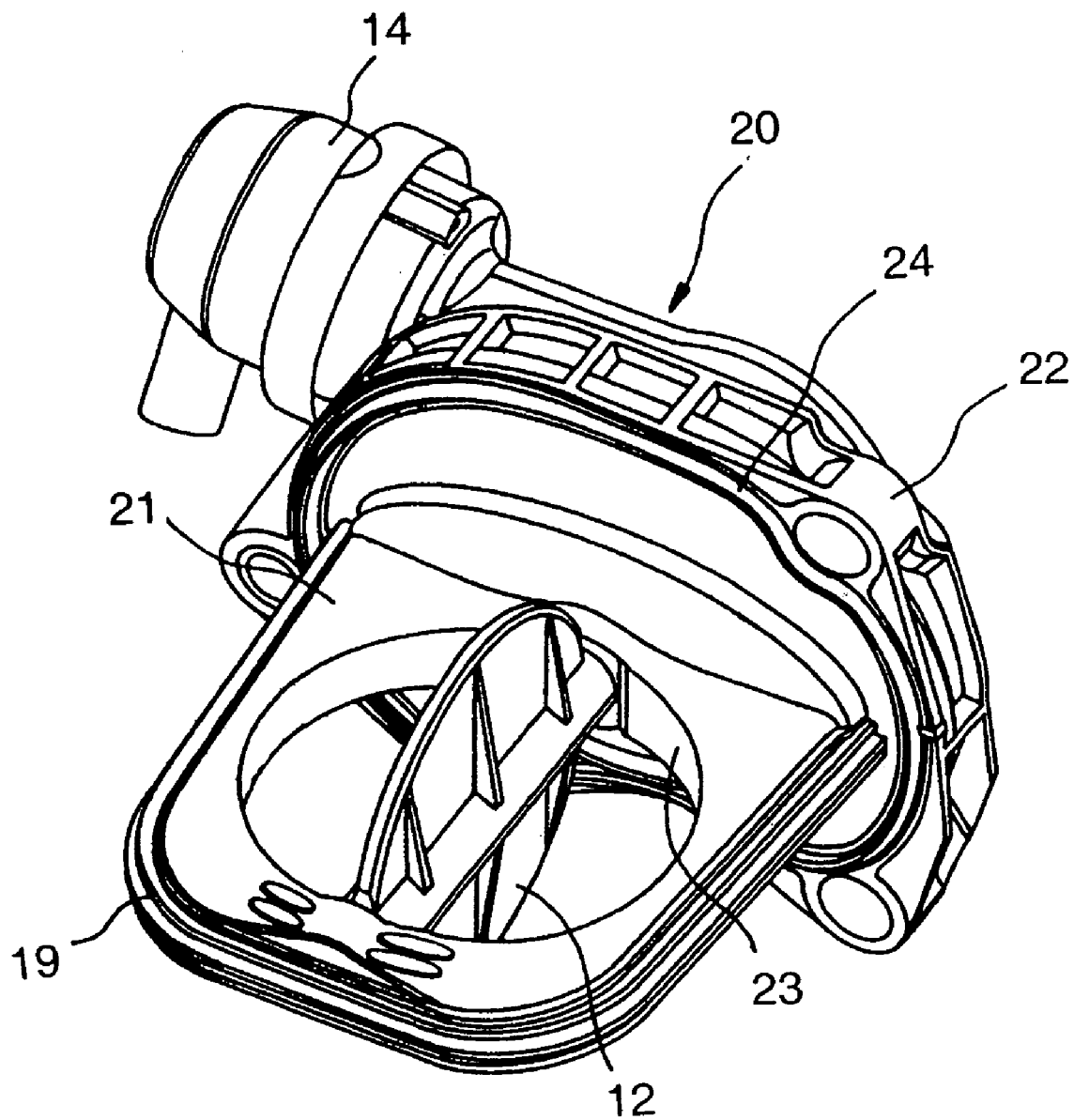
FIG. 6 is a perspective view of the communication valve used in the engine air intake device in accordance with the first embodiment of the present invention.

Referring now to FIGS. 6 and 7, the first and second valve mounting structures 20 and 30, and the seal structure between the first and second communication valve mounting strictures 20 and 30 and the partition wall 10 will be explained in more detail. The first and second valve mounting structures 20 and 30 are similar to each other in their configurations except for the difference in structural shapes and dimensions of the first and second communication valves 12 and 13. Similarly, the seal structure between the first communication valve structure 20 and the partition wall 10 and the seal structure between the second communication valve 13 and the partition wall 10 are basically identical. Thus, only the first valve mounting structure 20 and the seal structure between the first valve mounting structure 20 and the partition wall 10 will be explained herein for the sake of brevity.

Figure 7A:
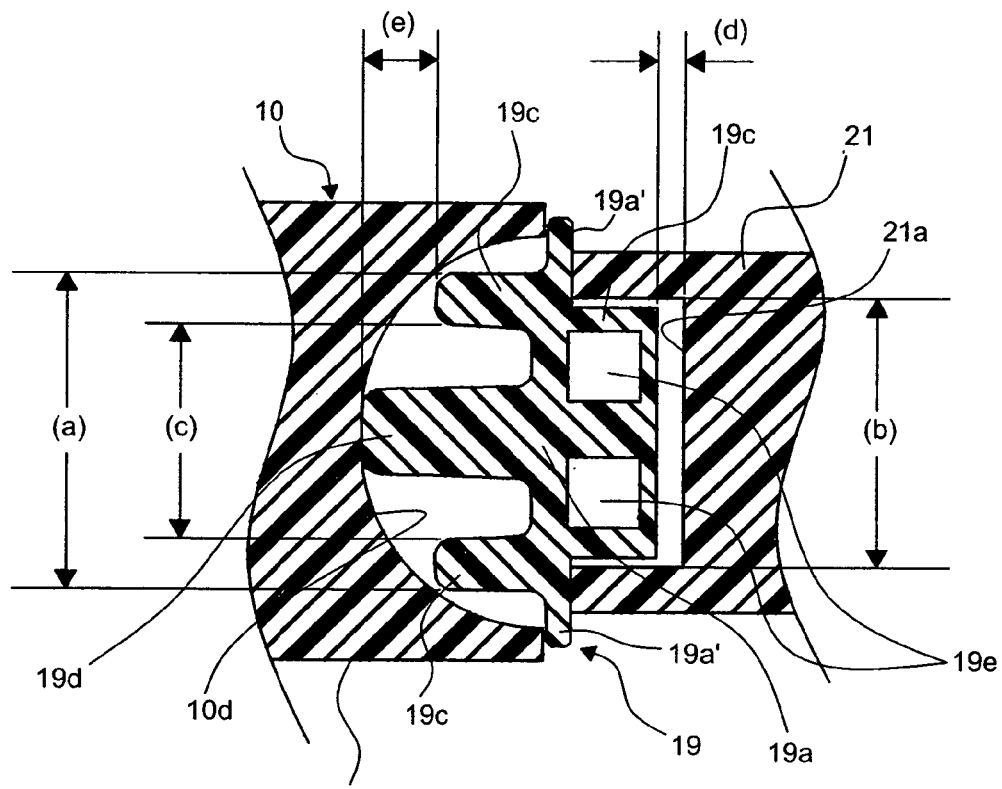
FIG. 7($a$) is a cross sectional view illustrating the state of a partition wall seal member at the stage when the partition wall seal member is first starting to make contact with a partition wall as a first valve mounting structure is being installed into a collector in accordance with the first embodiment of the present invention.
Figure 7B:
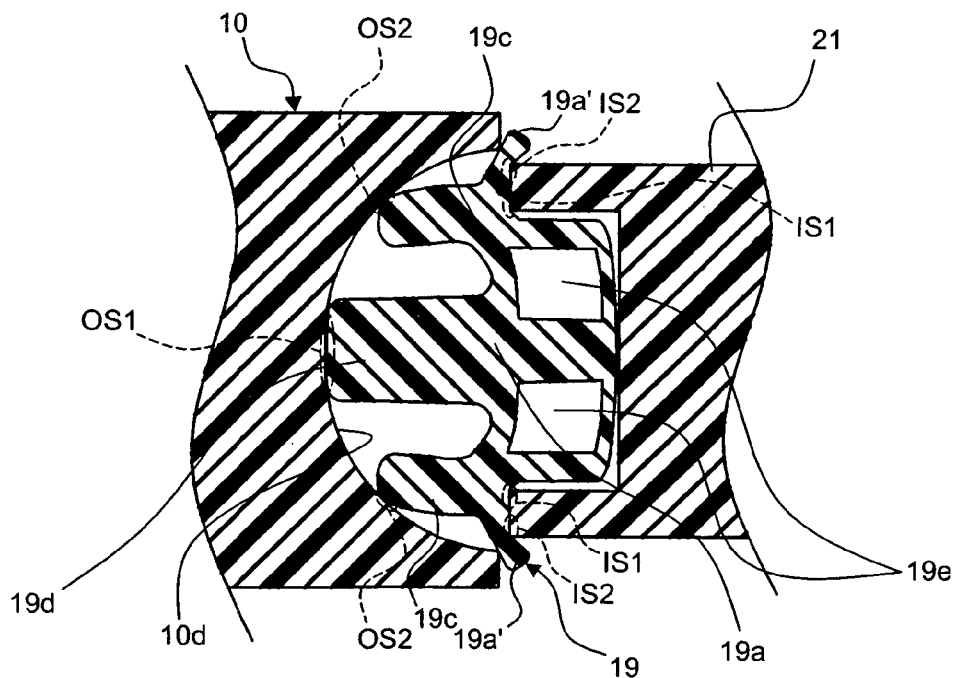

FIG. 6 is a perspective view of the first valve mounting structure 20. FIG. 7(a) is a cross sectional view illustrating the state of a partition wall seal member at the stage when the first valve mounting structure 20 is being installed into the collector 5. FIG. 7(b) is a cross sectional view illustrating the seal structure between the first valve mounting structure 20 and the partition wall 10 as taken along a section line 7(b)—7(b) of FIG. 3.

As shown in FIG. 6, the first valve mounting structure 20 basically comprises a base plate 21, a mounting flange 22, the first communication valve 12, and the first actuator 14. The base plate 21 is provided with a valve port 23 forming a valve seat. The mounting flange 22 is oriented substantially perpendicularly to the base plate 21. The first communication valve 12 is arranged with respect to the base plate 21 so that the valve element 12a of the first communication valve 12 can open and close the valve port 23 of the base plate 21. The first actuator 14 is configured and arranged to operate (i.e., turn) the rotary shaft 12b formed integrally with the valve element 12a from the outside of the mounting flange 22. The mounting flange 22 is configured and arranged to be fastened to the flange 17 formed on the collector 5 and on the intake runner 4a with a seal ring 24 disposed there-between. The base plate 21 and the mounting flange 22 are preferably made of polyamide based synthetic polymer resin (e.g., the materials known by the trade name "Nylon") or the like and preferably formed as a one-piece, unitary member by injection molding to a high standard of precision with respect to shape.

As seen in FIG. 3, the first valve mounting structure 20 is coupled to the first valve receiving section 10b of the partition wall 10 as a partition wall seal member 19 disposed therebetween. The partition wall seal member 19 is preferably made of a rubber material (e.g., a synthetic rubber) or other material having elasticity and resiliency.

The outer end surface of the first valve receiving section 10b of the partition wall 10 that faces toward the flange 17 is recessed toward the inside of the collector 5 in a trapezoidal shape as shown in FIG. 3. The outer perimeter of the base plate 21 of the first communication valve 12 connects to the outer edge surface of the partition wall 10 with the recessed outline through the partition wall seal member 19. More specifically, as seen in FIG. 6, the base plate 21 of the first valve mounting structure 20 is formed such that its outer perimeter has the shape of a trapezoid that narrows from the mounting flange 22 toward the tip end of the base plate 21. A perimeter groove 21a (shown in FIGS. 7(a) and 7(b)) is formed in the outwardly facing surface of the outer perimeter of the base plate 21. The perimeter groove 21a is configured and arranged to support and hold the partition wall seal member 19 therein. When the first valve mounting structure 20 is installed into the collector 5, the partition wall seal member 19 contacts the trapezoidal end surface of the first valve receiving section 10b of the partition wall 10 so that intake air cannot communicate between the upper collector portion 5a and the lower collector portion 5b through gaps between the contacting surfaces of the base plate 21 and the partition wall 10.

As explained above, the first valve receiving section 10b of the partition wall 10 where the base plate 21 of the first valve mounting structure 20 is coupled to is thicker than the wall body section 10a of the partition wall 10. The outer edge surface of the first valve receiving section 10b of the partition wall 10 is provided with a concaved cross sectional shape in which a pair of wall surfaces thereof is slanted toward each other. For example, the outer edge surface of the first valve receiving section 10b is provided with a semicircular groove 10d, which is described in more detail below with referring to FIG. 7(a). The semicircular groove 10d can be formed on the outer edge surface of the first valve receiving section 10b by end milling or other machining process.

The partition wall seal member 19 has the shape of a trapezoid whose base side is missing in order to follow the contour of the outer perimeter of the base plate 21 in which it is held and supported. FIG. 7(a) is a cross sectional view of the seal structure between the first valve mounting structure 20 and the partition wall 10 via the partition wall seal member 19 illustrating the state of the partition wall seal member 19 at the stage when the partition wall seal member 19 is first starting to make contact with the semicircular groove 10d of the partition wall 10 as the first valve mounting structure 20 is being installed into the collector 5. As seen in FIG. 7(a), the partition wall seal member 19 includes a base section 19a, a stopper section 19b and a bead section including a pair of side beads 19c and a middle bead 19d disposed between the side beads 19c. The base section 19a is configured and arranged to fit against the outer perimeter of the base plate 21 as seen in FIG. 7(a). The stopper section 19b is configured and arranged to protrude inward toward the perimeter groove 21a from the base section 19a and to fit into the perimeter groove 21a. The side beads 19c and the middle bead 19d are configured and arranged to protrude outwardly toward the partition wall 10 of the collector 5 from the base section 19a and mate against the semicircular groove 10d formed in the outer edge surface of the first valve receiving section 10b of the partition wall 10. The base section 19a, the stopper section 19b, and the bead section with the side beads 19c and the middle bead 19d preferably extend uninterruptedly over the entire length of the partition wall seal member 19. FIG. 7(b) is a cross sectional view illustrating the general shape of the partition wall seal member 19 after the first valve mounting structure 20 is fully installed into the collector.

The base section 19a of the partition wall seal member 19 is configured and arranged to fit onto the outer perimeter (edge surface) of the base plate 21 and is formed to be wider than the thickness of the base plate 21 of the first valve mounting structure 20 such that a pair of protruding edge portions 19a' of the base section 19a protrude beyond the main surfaces of the base plate 21. As seen in FIG. 7(b), the sides of the protruding edge portions 19a' of the base section 19a that correspond to the top and bottom sides of where the stopper section 19b is located, i.e., the back faces (inwardly facing surfaces) of the protruding edge portions 19a' of the base section 19a, touch against the outer perimeter surfaces (i.e. rims) of the base plate 21 that extend on both top and bottom sides of the perimeter groove 21a. When the first valve mounting structure 20 is installed and the bead section of the partition wall seal member 19 is pressed against the outer edge surface of the partition wall 10 as seen in FIG. 7(b), the resulting reaction force causes the stopper section 19b to recede farther into the perimeter groove 21a and the protruding edge portions 19a' of the base section 19a to contact the rims of the perimeter groove 21a with high pressure. As a result, first inner seals IS1 are formed between the base plate 21 and the partition wall seal member 19.

The protruding edge portions 19a' of the base section 19a also touch against the rims of the semicircular groove 10d formed in the outer edge surface of the partition wall 10 and are bent toward the base plate 21 of the first valve mounting structure 20 such that the back surfaces thereof contact the edges of the outer perimeter surfaces of the base plate 21 with high pressure. As a result, second inner seals IS2 are formed between the base plate 21 and the partition wall seal member 19.

The stopper section 19b protrudes from the base section 19a and into the perimeter groove 21a formed in the outer perimeter of the base plate 21. The stopper section 19b fits into the perimeter groove 21a such that gaps exist between the stopper section 19b and the bottom and side walls of the perimeter groove 21a. The gap between the tip of the stopper section 19b and the bottom of the perimeter groove 21a serves to allow the base section 19a to deform inward into the perimeter groove 21a as seen in FIG. 7(b) and to allow high pressure contact to develop between the back side of the protruding edge portions 19a' of the base section 19a and the rims of the perimeter groove 21a, which achieves the first inner seals IS1. The stopper section 19b and the portion of the base section 19a that contacts the base plate 21 preferably constitute the base plate engaging section of the present invention.

The gaps between the stopper section 19b and the bottom and side walls of the perimeter groove 21a are set such that the middle bead 19d of the bead section (further discussed in more detail later) contacts the semicircular groove 10d of the partition wall 10 lightly during the initial stages of contact due to the bending deformation of the base section 19a and the stopper section 19b. Then, after the tip of the stopper section 19b contacts the bottom of the perimeter groove 21a, the resulting compressive deformation of the base section 19a and the stopper section 19b causes the contact pressure between the middle bead 19d and the semicircular groove 10d to increase rapidly. In order to adjust the strength of the base section 19a and the stopper section 19b with respect to bending deformation and compressive deformation, a plurality of rectangular spaces 19*e* that run the full length of the partition wall seal member 19 are provided in the stopper section 19*b*, as shown in FIGS. 7(*a*) and 7(*b*).

As shown in FIG. 7(*a*), an initial distance (d) of the gap between the tip of the stopper section 19*b* and the bottom of the perimeter groove 21*a* is set to be smaller than a height difference (e) between the middle bead 19*d* and the side beads 19*c* in order to prevent the tip of the middle bead 19*d* from becoming lower than the tips of the side beads 19*c*.

As mentioned above, the bead section comprises three beads, the pair of side beads 19*c* and the middle bead 19*d*, that protrude from the base section 19*a* toward the partition wall 10 of the collector 5 and mate with the semicircular groove 10*d* provided in the outer edge surface of the partition wall 10. The middle bead 19*d* is designed to be higher than the side beads 19*c* as measured from the base section 19*a* in order to follow the contour of the semicircular groove 10*d* of the partition wall 10. When the first valve mounting structure 20 is installed and the partition wall seal member 19 mates with the semicircular groove 10*d* of the partition wall 10, the middle bead 19*d* substantially perpendicularly contacts a central portion of the bottom of the semicircular groove 10*d* and forms a first outer seal OS1 between the partition wall 10 and the partition wall seal member 19 as seen in FIG. 7(*b*). The bead section and the portion of the base section 19*a* that contacts the partition wall 10 preferably constitute the partition wall engaging section of the present invention.

The side beads 19*c* contact slanted intermediate wall surfaces between the center portion and the side portions of the semicircular groove 10*d* with shoulder portions of the side beads 19*c*. The side beads 19*c* bend toward the middle bead 19*d* and the elastic contacts between the shoulder portions of the side beads 19*c* and the intermediate wall surfaces of the semicircular groove 10*d* form second outer seals OS2 between the partition wall 10 and the partition wall seal member 19. The portions of the base section 19*a* where the side beads 19*c* are formed correspond to the portions of the back surface of the base section 19*a* where the first inner seals IS1 are formed due to high pressure contact with the rims of the perimeter groove 21*a*. That is, as seen in FIG. 7(*a*), the semicircular groove 10*d* and the partition wall seal member 19 are designed such that a width (b) of the perimeter groove 21*a* is smaller than a distance (a) between the outermost sides of the side beads 19*c* and larger than a distance (c) between the innermost sides of the side beads 19*c*. In other words, the distance (a) corresponds to a maximum distance between the side beads 19*c*, and the distance (c) corresponds to a minimum distance between the side beads 19*c*. In short, the size of the width (b) is between the sizes of the distance (a) and the distance (c). Consequently, the reaction force of the second outer seals OS2 formed by the side beads 19*c* creates contact pressure at the first inner seals IS1 and increases the seal performance of all four seals IS1, IS2, OS1 and OS2.

The reaction forces that result when the side beads 19*c* that form the second outer seals OS2 bend toward the middle bead 19*d* act against the surface of the semicircular groove 10*d* of the partition wall 10 in sideways directions perpendicular to the depth direction and the side ways reaction force of the left bead 29 is in a direction opposite the direction of the reaction force of the right bead 29. Thus, the side beads 19*c* accomplish a centering function that prevents the partition wall seal member 19 and the semicircular groove 10*d* from becoming off-centered relative to each other.

With the variable air intake device seal structure described above, the first valve mounting structure 20 is assembled by mounting the rotary shaft 12*b*, the valve element 12*a*, and the first actuator 14 to the base plate 21 and the mounting flange 22 (which are formed as a one-piece unitary member) and fitting the stopper section 19*b* of the partition wall seal member 19 into the perimeter groove 21*a* of the base plate 21. The first valve mounting structure 20 is then inserted into the collector 5 while positioning the partition wall seal member 19 to be properly aligned with the outer edge surface of the partition wall 10 of the collector 5. Finally, the mounting flange 22 is fastened to the flange 17 of the collector 5 with the partition wall seal member 19 pinched between the partition wall 10 and the base plate 21.

During the assembly described above, since the end of the partition wall 10 and outer perimeter of the base plate 21 are both trapezoidal in shape, the middle bead 19*d* and the side beads 19*c* of the partition wall seal member 19 come in contact with the semicircular groove 10*d* of the partition wall 10 immediately before the first valve mounting structure 20 and the partition wall 10 are joined together so that the partition wall seal member 19 is sandwiched between the first valve receiving section 10*b* and the base plate 21. Thus, the partition wall seal member 19 and the base plate 21 are guided by the semicircular groove 10*d* and the side beads 19*c* as they are pushed into position. As a result, as seen in FIG. 7(*b*), the partition wall seal member 19 can be deformed at the desired position and into the desired shape during assembly and the precision and ease of assembly can be improved. In short, the intended sealing performance can be achieved in a reliable manner.

Additionally, since the outline of the outer edge surface of the partition wall 10 and the perimeter of the base plate 21 are trapezoidal in shape and the middle bead 19*d* and the side beads 19*c* of the partition wall seal member 19 are in contact with the semicircular groove 10*d* of the partition wall 10 immediately before the first valve mounting structure 20 and the partition wall 10 are joined together so that the partition wall seal member 19 is sandwiched between the partition wall 10 and the base plate 21, the partition wall seal member 19 is not scraped against or otherwise damaged by the outer edge surface of the partition wall 10 and the first valve mounting structure 20 can be installed without having to increase the insertion force used during installation. Thus, again, the ease of assembly is improved.

The seal performance between the partition wall 10 and the partition wall seal member 19 is improved because the seal structure is configured and arranged such that a plurality of seals (i.e., the first and section outer seals OS1 and OS2) are formed between the bead section of the partition wall seal member 19 and the semicircular groove 10*d* of the partition wall 10 when the assembly and installation of the first valve mounting structure 20 is complete. Similarly, the seal performance between the base plate 21 and the partition wall seal member 19 is improved because the seal structure is configured and arranged such that a plurality of seals (i.e., the first and second inner seals IS1 and IS2) are formed between the partition wall seal member 19 and the outer perimeter of the base plate 21 of the first valve mounting structure 20. Consequently, pressure leaks between the two upper and lower collector portions 5*a* and 5*b* can be prevented reliably.

Accordingly, with the engine air intake device of the present invention, the first communication valve 12 is configured and arranged to open and close the valve port 23 in accordance with the engine operating conditions, The valve port 23 is configured and arranged to serve as a communication passage between the upper and lower collector portions 5a and 5b to which the intake runners 4a to 4f communicating with the first and second groups of cylinders having non-consecutive firing orders are connected. The first valve mounting structure 20 has the base plate 21 in which the valve port 23 is formed. The first valve mounting structure 20 is configured to be inserted into the collector 5 (which is a passage element that will house the first valve mounting structure 20) through the insertion opening such that the partition wall seal member 19 is disposed between the outer perimeter of the base plate 21 and the partition wall 10 (which is a structural component of the passage element). The outer edge surface of the partition wall 10 against which the partition wall seal member 19 contacts is provided with a groove. The wall surfaces of the groove are oriented to face each other in a slanted manner. For example, the semicircular groove 10d is provided. Meanwhile, the partition wall seal member 19 is arranged on the outer perimeter of the base plate 21 and the outwardly facing side thereof is provided with the high middle bead 19d and the low side beads 19c that follow the contour of the cross sectional shape of the U-shaped groove (i.e., the semicircular groove 10d). The outer perimeter of the base plate 21 is sealed by the contact of the tip portions of the middle bead 19d and the side beads 19c against the bottom portion and wall surfaces of the semicircular groove 10d of the partition wall 10. As a result, the multiple seals IS1, IS2, OS1 and OS2 are formed and the sealing performance is improved.

The middle bead 19d contacts the bottom portion of the semicircular groove 10d and the side beads 19c contact the wall surfaces of the semicircular groove 10d. Consequently, during installation of the first valve mounting structure 20, the middle bead 19d and the side beads 19c following along the semicircular groove 10d and function as guides, thus improve the ease of assembly. Additionally, since the side beads 19c are lower than the middle bead 19d, the side beads 19c can be prevented from being pushed over to the outside during assembly (i.e., installation of the first valve mounting structure 20 to the collector).

In the embodiment explained above, the perimeter groove 21a is formed in the outwardly facing surface of the outer perimeter of the base plate 21. The partition wall seal member 19 is provided with the stopper section 19b (i.e., an inward protrusion) that is fitted into the perimeter groove 21a to hold the partition wall seal member 19 to the outer perimeter of the base plate 21. The width (b) of the perimeter groove 21a is smaller than the distance (a) between the outermost sides of the side beads 19c (maximum distance between the side beads 19c) and larger than the distance (c) between the innermost sides of the side beads 19c (minimum distance between the side beads 19c). As a result, the bottom faces of the side beads 19c press aggressively against the corner portions of the perimeter groove 21a and improve the sealing performance between the base plate 21 and the partition wall seal member 19.

In the embodiment explained above, the height (protruding dimension) of the stopper section 19b of the partition wall seal member 19 is smaller than the depth of the perimeter groove 21a of the base plate 21. Consequently, there is a gap with the distance (d) between the bottom of the perimeter groove 21a and the partition wall seal member 19. This gap prevents the decline in sealing performance that might occur if the bottom surface of the partition wall seal member 19 contacted the bottom of the perimeter groove 21a too early due to the pressure of the middle bead 19d against the semicircular groove 10d and impeded the development of pressure between the bottom surfaces of the side beads 19c and the corner portions of the perimeter groove 21a.

In the embodiment explained above, the outer perimeter of the base plate 21 has the trapezoidal shape that narrows as from the portion of the base plate 21 near the insertion opening toward the portion of the base plate 21 that fits deepest into the partition wall 10. Consequently, when the base plate 21 is inserted through the insertion hole 17a formed in a collector case of the collector 5, the middle bead 19d and the side beads 19c of the partition wall seal member 19 come in contact with the semicircular groove 10d of the passage element immediately before the insertion is completed. Thus, the partition wall seal member 19 and base plate 21 are guided by the semicircular groove 10d and the side beads 19c as they are pushed into position. As a result, the partition wall seal member 19 can be deformed at the desired position and into the desired shape during assembly and the precision and ease of assembly can be improved.

In the embodiment explained above, the structural component of the collector 5 is obtained by forming the upper and lower collector portions 5a and 5b by separating the collector 5 with the partition wall 10, cutting away a portion of the partition wall 10 along with a corresponding portion of the case of the collector 5, and forming the semicircular groove 10d in the resulting outer edge surface of the partition wall 10. The semicircular groove 10d is configured to mate with the partition wall seal member 19 installed on the outside perimeter of the base plate 21. As a result, the communication between the upper and lower collector portions 5a and 5b can be opened and shut off with the first communication valve 12 without using the body of the collector 5.

Although in the embodiment described herein the semicircular groove 10d is used as a groove formed on the outer edge surface of the partition wall 10, any cross sectional shape is acceptable for the outer edge surface of the partition wall 10 as long as the wall surfaces of the outer edge surface are oriented to face each other in a slanted manner. For example, a trapezoidal or triangular cross sectional shape is acceptable for the outer edge surface of the partition wall 10 instead of the semicircular shape.

Also, although in the embodiment described herein the first communication valve 12 is installed in the partition wall 10 that separates upper and lower collectors 5a and 5b, the first communication valve 12 can also be arranged in a communication pipe arranged and configured to allow communication between upper and lower collectors that are formed as separate entities and connected by the communication pipe.

Accordingly, with the engine air intake device in accordance with the present invention, the plurality of communication valves (e.g., two communication valves 12 and 13) are provided in the partition wall 10 that divides the inside of the collector 5 into two volume chambers (the upper and lower collectors 5a and 5b) so that communication between the upper and lower collector portions 5a and 5b can be achieved by opening the communication valves 12 and/or 13. The use of a plurality of communication valves enables smaller and less expensive communication valves to be used than in a case in which only one communication valve is used and enables the entire air intake device (including the actuators 14 and 15 that drive the communication valves 12 and 13, respectively) to be made more compact. Since the communication valves 12 and 13 are arranged in positions that avoid the main flow of the intake air inside the collector 5, an increase in air flow resistance caused by the communication valves 12 and 13 can be prevented and the output increasing effect can be obtained in an effective manner.

Moreover, in the present invention, the semicircular groove 10d formed in the portion of the partition wall 10 that contacts the partition wall seal member 19 while the wall surfaces of the semicircular groove 10d being oriented to face each other in a slanted fashion, the partition wall seal member 19 is arranged on the base plate 21 of the first valve mounting structure 20 and the outwardly facing side thereof is provided with the high middle bead 19d and the low side beads 19c that follow the contour of the cross sectional shape of the semicircular groove 10d, and the outer perimeter of the base plate 21 is sealed by the contact of the tip portions of the middle bead 19d and the side beads 19c of the partition wall seal member 19 against the bottom portion and wall surfaces of the semicircular groove 10d of the partition wall 10. Therefore, the present invention achieves a multiple sealing effect that improves the sealing performance between the first valve mounting structure 20 and the partition wall 10.

As used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±15% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. An engine air intake device comprising:
   a collector divided by a partition wall into first and second volume chambers;
   a first upstream intake pipe portion connected to an upstream side of the first volume chamber relative to a flow of intake air;
   a second upstream intake pipe portion connected to an upstream side of the second volume chamber relative to the flow of intake air;
   a plurality of first downstream branch pipes extending from the first volume chamber to respective intake ports of a first bank of first cylinders;
   a plurality of second downstream branch pipes extending from the second volume chamber to respective intake ports of a second bank of second cylinders;
   a first communication valve mounted to the partition wall in a position that does not interfere with a path of a main flow of intake air inside the collector, the first communication valve being configured and arranged to allow communication between the first volume chamber and the second volume chamber when the first communication valve is open; and
   a second communication valve mounted to the partition wall in a position that does not interfere with the path of the main flow of intake air inside the collector, the second communication valve being configured and arranged to allow communication between the first volume chamber and the second volume chamber when the second communication valve is opened.

2. The engine air intake device recited in claim 1, wherein the first upstream intake pipe portion and the second upstream intake pipe portion connect to the first volume chamber and the second volume chamber, respectively, at an approximate center portion of the collector with respect to a direction in which the first and second cylinders are aligned.

3. The engine air intake device recited in claim 2, wherein the first communication valve is disposed in the collector outside of a hypothetical plane extending perpendicular to the partition wall and extending between an outer edge of an opening of the first upstream intake pipe portion into the first volume chamber and an outer end edge of an opening of one of the first downstream branch pipes that is located at a first end position of the first downstream branch pipes.

4. The engine air intake device recited in claim 3, wherein the second communication valve is disposed in the collector outside of a hypothetical plane extending perpendicular to the partition wall and extending between an outer edge of an opening of the second upstream intake pipe portion into the second volume chamber and an outer end edge of an opening of one of the second downstream branch pipes that is located at a second end position of the first downstream branch pipes.

5. The engine air intake device recited in claim 1, wherein the first communication valve has a first valve rotary shaft and a first valve element rotatably coupled to the first valve rotary shaft, the first valve rotary shaft being oriented substantially parallel to a direction of a communication flow of intake air that occurs when the first communication valve is open.

6. The engine air intake device recited in claim 1, wherein the first communication valve has a first valve rotary shaft and a first valve element rotatably coupled to the first valve rotary shaft, the first valve rotary shaft being oriented substantially parallel to a direction of a communication flow of intake air that occurs when the first communication valve is open, and
   the second communication valve has a second valve rotary shaft and a second valve element rotatably coupled to the second valve rotary shaft, the second valve rotary shaft being oriented substantially parallel to a direction of a communication flow of intake air that occurs when the second communication valve is open.

7. The engine air intake device recited in claim 1, wherein the partition wall has a wall body section and first and second valve receiving sections with the first and second communication valves mounted thereto, respectively, the first and second valve receiving sections having a larger thickness than the wall body section.

8. The engine air intake device recited in claim 1, further comprising first and second actuators operatively coupled to the first and second communication valves, respectively, to open and close the first and second communication valves, the first and second actuators being mounted on opposite sides of the collector such that a hypothetical line extending between the first and second actuators is substantially parallel to a direction in which the first and second cylinders are aligned.

9. The engine air intake device recited in claim 1, wherein the first upstream intake pipe portion and the second upstream intake pipe portion are formed by a single intake pipe connected to an upstream side of the collector relative to the flow of intake air and divided by an intake pipe partition wall into two sections to form the first and second upstream intake pipe portions.

10. An engine air intake device comprising:

a collector divided by a partition wall into first and second volume chambers;

a first upstream intake pipe portion connected to an upstream side of the first volume chamber relative to a flow of intake air;

a second upstream intake pipe portion connected to an upstream side of the second volume chamber relative to the flow of intake air;

a plurality of first downstream branch pipes extending from the first volume chamber to respective intake ports of a first bank of first cylinders;

a plurality of second downstream branch pipes extending from the second volume chamber to respective intake ports of a second bank of second cylinders; and a first communication valve mounted to the partition wall in a position that does not interfere with a path of a main flow of intake air inside the collector, the first communication valve being configured and arranged to allow communication between the first volume chamber and the second volume chamber when the first communication valve is open, the partition wall having a wall body portion and a first valve receiving portion with the first communication valve mounted thereto, the first valve receiving portion having a larger thickness than the wall body portion.

11. An engine air intake device comprising:

a collector divided by a partition wall into first and second volume chambers;

a first upstream intake pipe portion connected to an upstream side of the first volume chamber relative to a flow of intake air;

a second upstream intake pipe portion connected to an upstream side of the second volume chamber relative to the flow of intake air;

a plurality of first downstream branch pipes extending from the first volume chamber to respective intake ports of a first bank of first cylinders;

a plurality of second downstream branch pipes extending from the second volume chamber to respective intake ports of a second bank of second cylinders;

a first communication valve mounted to the partition wall in a position that does not interfere with a path of a main flow of intake air inside the collector, the first communication valve being configured and arranged to allow communication between the first volume chamber and the second volume chamber when the first communication valve is open;

a first valve mounting structure having a base plate member coupled to the first communication valve so that the first communication valve is mounted to a first valve receiving section of the partition wall by inserting the base plate member from an insertion opening formed in the collector to the valve receiving section of the partition wall; and a partition wall seal member disposed between the base plate member of the first valve mounting structure and the first valve receiving section of the partition wall, the first valve receiving section of the partition wall having an outer edge surface having a concaved cross sectional shape with a pair of side wall surfaces thereof being slanted toward each other.

12. The engine air intake device recited in claim 11, wherein the partition wall seal member includes a partition wall engaging section with a cross sectional shape having a pair of low side beads and a high middle bead disposed between the side low beads, heights of the side beads and the middle bead being configured and arranged to conform with a contour of the outer edge surface of the first valve receiving section of the partition wall so that the base plate member of the first valve mounting structure and the valve receiving section of the partition wall is sealed as tips of the side beads and the middle bead abut against the outer edge surface of the valve receiving section of the partition wall.

13. An engine air intake device comprising:

a collector divided by a partition wall into first and second volume chambers;

a first upstream intake pipe portion connected to an upstream side of the first volume chamber relative to a flow of intake air;

a second upstream intake pipe portion connected to an upstream side of the second volume chamber relative to the flow of intake air;

a plurality of first downstream branch pipes extending from the first volume chamber to respective intake ports of a first bank of first cylinders;

a plurality of second downstream branch pipes extending from the second volume chamber to respective intake ports of a second bank of second cylinders;

a first communication valve mounted to the partition wall in a position that does not interfere with a path of a main flow of intake air inside the collector, the first communication valve being configured and arranged to allow communication between the first volume chamber and the second volume chamber when the first communication valve is open;

a first valve mounting structure having a base plate member coupled to the first communication valve so that the first communication valve is mounted to a first valve receiving section of the partition wall by inserting the base plate member from an insertion opening formed in the collector to the valve receiving section of the partition wall; and a partition wall seal member disposed between the base plate member of the first valve mounting structure and the first valve receiving section of the partition wall, the partition wall seal member including a base plate engaging section having a protrusion inserted in a perimeter groove formed in a peripheral surface of the base plate member of the first valve mounting structure so that the partition wall seal member is retained in the peripheral surface of the base plate member.

14. The engine air intake device recited in claim 13, wherein the perimeter groove of the base plate member has a cross sectional width that is smaller than a maximum distance between the side beads and larger than a minimum distance between the side beads.

15. The engine air intake device recited in claim 13, wherein
a height of the protrusion of the base plate engaging section of the partition wall seal member is smaller than a depth of the perimeter groove of the base plate.

16. An engine air intake device comprising:
a collector divided by a partition wall into first and second volume chambers;
a first upstream intake pipe portion connected to an upstream side of the first volume chamber relative to a flow of intake air;
a second upstream intake pipe portion connected to an upstream side of the second volume chamber relative to the flow of intake air;
a plurality of first downstream branch pipes extending from the first volume chamber to respective intake ports of a first bank of first cylinders;
a plurality of second downstream branch pipes extending from the second volume chamber to respective intake ports of a second bank of second cylinders;
a first communication valve mounted to the partition wall in a position that does not interfere with a path of a main flow of intake air inside the collector, the first communication valve being configured and arranged to allow communication between the first volume chamber and the second volume chamber when the first communication valve is open;
a first valve mounting structure having a base plate member coupled to the first communication valve so that the first communication valve is mounted to a first valve receiving section of the partition wall by inserting the base plate member from an insertion opening formed in the collector to the valve receiving section of the partition wall; and a partition wall seal member disposed between the base plate member of the first valve mounting structure and the first valve receiving section of the partition wall,
an outline of an outer perimeter of the base plate member having a trapezoidal shape that narrows from the insertion opening toward a portion of the base plate that fits deepest into the partition wall.

17. The engine air intake device recited in claim 16, wherein
an outline of the outer edge surface of the partition wall has a trapezoidal shape that substantially conforms to the outline of the outer perimeter of the base plate member.

18. An engine air intake device comprising:
first intake collecting means for receiving intake air;
second intake collecting means for receiving intake air;
first intake air introducing means for conveying intake air from the first intake collecting means to respective intake ports of a first bank of first cylinders;
second intake air introducing means for conveying intake air from the second intake collecting means to respective intake ports of a second bank of second cylinders;
first communication means for selectively allowing communication between the first intake collecting means and the second intake collecting means without interfering with a path of a main flow of intake air inside the first intake collecting means and the second intake collecting means; and
second communication means for selectively allowing communication between the first intake collecting means and the second intake collecting means without interfering with the path of the main flow of intake air inside the first intake collecting means and the second intake collecting means.

* * * * *